United States Patent [19]
Zannucci et al.

[11] 3,971,755
[45] July 27, 1976

[54] POLYMER COMPOSITIONS CONTAINING TITANIUM DIOXIDE HAVING IMPROVED VISIBLE AND ULTRAVIOLET LIGHT STABILITY

[75] Inventors: Joseph Salvatore Zannucci; Gerald Ray Lappin, both of Kingsport, Tenn.

[73] Assignee: Eastman Kodak Company, Rochester, N.Y.

[22] Filed: Oct. 2, 1974

[21] Appl. No.: 511,401

[52] U.S. Cl. ............................. 260/42.45; 106/182; 106/193 J; 260/42.44; 260/45.75 R; 260/45.75 F; 260/45.75 W
[51] Int. Cl.² ...................... C08K 3/22; C08K 3/24
[58] Field of Search ....... 260/42.44, 42.45, 45.75 R, 260/45.75 F, 45.75 W; 106/182, 193 J

[56] References Cited
UNITED STATES PATENTS

| | | | |
|---|---|---|---|
| 2,710,811 | 6/1955 | De Croes | 106/193 J |
| 3,189,630 | 6/1965 | Smutny | 260/448 R |
| 3,325,441 | 6/1967 | McNally | 260/42.45 |

OTHER PUBLICATIONS

Chevassus, Fernand et al., The Stabilization of Polyvinyl Chloride, 1963, Edward Arnold Pub., London, pp. 75–83.

*Primary Examiner*—James H. Derrington
*Attorney, Agent, or Firm*—Clyde L. Tootle; Daniel B. Reece, III

[57] ABSTRACT

The zinc or manganese salt of 3,5-di-tert-alkyl-4-hydroxybenzoic acid is an ultraviolet absorber which provides a highly effective ultraviolet stabilizer system for $TiO_2$-pigmented polymeric compositions.

3 Claims, No Drawings

POLYMER COMPOSITIONS CONTAINING TITANIUM DIOXIDE HAVING IMPROVED VISIBLE AND ULTRAVIOLET LIGHT STABILITY

This invention relates to the ultraviolet light stabilization of polymer compositions, and more particularly to the ultraviolet light stabilization of titanium dioxide-pigmented polymer compositions.

Plastic compositions, such as polypropylene, have found wide acceptance as useful materials for making foils, films, fibers and molded articles. These formed articles are inherently strong, can be made dimensionally stable or sufficiently flexible to suit the requirements of their intended use, and are relatively inert to common household cleansing agents and solvents. However, such articles are unfortunately subject to rapid and severe degradation and deterioration, as evidenced by changes in the physical properties of the polymers, when subjected to the effects of sunlight, and particularly ultraviolet light. Such photodegradation is particularly evidenced by surface cracking, increased brittleness, loss of dielectric properties and discoloration of the polymer. Polymer compositions which contain titanium dioxide pigment are sometimes even more susceptible to photodegradation and are more difficult to stabilize against such photodegradation than are the unpigmented polymers. For example, the addition of titanium dioxide to polyolefins may destabilize the polyolefin composition. For example, the addition of 20% titanium dioxide (Ti-Pure R-100) to polypropylene reduces the lifetime to embrittlement of 5-mil thick films from 4 days to 1.5 days (irradiated at 65°–70°C. with 3000 A lamps). Moreover, an ultraviolet stable polyolefin containing an ultraviolet stabilizer may become destabilized by the addition of titanium dioxide. Moreover, the addition of the usual ultraviolet absorbers to such pigmented polyolefin formulations generally provides little or no improvement of this ultraviolet instability. For example, an unpigmented polypropylene film (5-mils thick) containing 0.5% of 4-(dodecyloxy)-2-hydroxybenzophenone or 0.5% 2-(2H-benzotriazol-2-yl)-4,6-di-tert-pentylphenol will have a lifetime to embrittlement of approximately 28 days (irradiated with 3000 A lamps in a photochemical reactor with an air temperature of 65°–70°C.). However, the addition of 5% of titanium dioxide (Ti-Pure R-100) to these compositions will decrease the lifetime to embrittlement to 4 days, films without the ultraviolet absorber also have lifetimes to embrittlement of 4 days.

Therefore, while there are many additives, stabilizers and mixtures thereof which are known in the art to improve the ultraviolet light stability of organic compositions, there is a need in the art for more efficient and effective ultraviolet stabilizers to prevent the photodegradation of titanium dioxide containing polymeric compositions, particularly polyolefin compositions. Therefore, to provide a more effective and efficient ultraviolet stabilizer for such titanium dioxide pigmented compositions would be an advance in the state of the art.

It is therefore an object of the present invention to provide a more effective and efficient ultraviolet stabilized polymeric compositions.

Another object of this invention is to provide more effective and efficient ultraviolet stabilized pigmented polymeric compositions.

A still further object of the invention is to provide more effective and efficient ultraviolet light stabilized titanium dioxide pigmented polymeric compositions.

Further objectives and advantages of the invention will be apparent to those skilled in the art from the accompanying disclosure and claims.

In accordance with the present invention, there is provided a titanium dioxide-pigmented polymeric composition normally susceptible to degradation due to visible or ultraviolet light containing a stabilizing amount of a compound having the formula

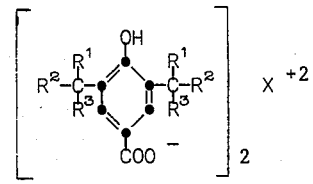

wherein $R^1$, $R^2$ and $R^3$ are the same or different and each represents a branched or unbranched alkyl group having 1 to 8 carbon atoms and $X^{+2}$ is either $Mn^{+2}$ or $Zn^{+2}$.

The titanium dioxide-pigmented polymeric compositions normally susceptible to ultraviolet light degradation include, for example, pigmented polymeric compositions such as polyester fiber and moldable compositions, such, for example, as polyethylene terephthalate, poly(tetramethylene terephthalate), unsaturated polyester resins, copolyesters and the like; polyolefins such as, for example, high, medium and low density polyethylene, polypropylene, polybutene and the like; polyamides such as N-methoxymethyl poly(hexamethylene adipamide) and the like; vinylidene chloride copolymers such as vinylidene chloride/vinyl acetate copolymers; polycarbonates; poly(vinyl chloride); cellulose esters; acrylic/butadiene/styrene plastic; ethylene/vinyl acetate copolymers; cellulose ethers such as methyl cellulose; polyacrylics such as methyl methacrylate; polyethylene oxide; polyvinyl acetals; polyurethanes; polyformaldehydes; polystyrenes and gelatin. Such compositions also include natural and synthetic rubbers such as polybutadiene, and unsaturated organic compositions such as oils and the like, as well as compositions containing such organic compositions.

In a preferred embodiment of this invention the titanium dioxide-pigmented polymer is a polyolefin, and particularly a propylene containing polyolefin such as polypropylene or a polypropylene having grafted thereto acrylic acid or maleic anhydride or acid. Such titanium dioxide-pigmented polyolefins include those polymers prepared by (1) polymerizing propylene, (2) first polymerizing propylene and then a mixture of α-monoolefins containing 2 to 12 carbon atoms to form a block copolymer, (3) polymerizing first propylene and then a diolefin such as isoprene, butadiene and substituted butadiene, and (4) reacting acrylic acid or maleic acid or maleic anhydride with one of the polymers made according to (1), (2) or (3). These polyolefin compositions may then be pigmented with titanium dioxide, generally in an amount of from 0.05% to about 50% based on the weight of the polymer. The preferred amount of titanium dioxide used in a molding composition is about 0.5 to 10%, in a fiber forming composition in an amount of 0.1 to 2% and in a coating composition in an amount of about 5 to 30%.

The methods of pigmenting these polymers are well known in the art and can be accomplished in the same manner as used for adding the zinc and manganese ultraviolet stabilizer additives to the pigmented composition. Such methods include melt blending in conventional mixers or extruders.

The zinc and magnesium salts of 3,5-di-tert-butyl-4-hydroxybenzoic acid provide substantially no improvement in the photostability of polymeric compositions which do not contain titanium dioxide. The salts have been used in combination with other stabilizers, such as 4-(dodecyloxy)-2-hydroxybenzophenone which is the subject of applicants' copending application Ser. No. 465,470 filed Apr. 30, 1974, now U.S. Pat. No. 3,900,442 entitled "Titanium Dioxide Pigmented Polymeric Compositions With Improved Visible and Ultraviolet Light Stability", now U.S. Pat. No. 3,900,442. These salts have also been used to improve the dyeability of polymeric compositions such as polypropylene. However, it has not been recognized in the art that these salts alone provide excellent ultraviolet stabilization when added to titanium dioxide containing polymeric compositions. Moreover, this unique stabilization is unexpected and unobvious since other zinc salts of similar structure have little effect on the photostability of titanium dioxide-pigmented polyolefins.

The ultraviolet stabilized polymeric compositions produced in accordance with this invention can be prepared by dissolving the salt additive component in a suitable dispersant and coating particles of the titanium dioxide pigmented polymeric composition with the dispersed salt or solution followed by drying so as to remove the solvent. The stabilizer containing particles are useful for the manufacture of shaped objects such as fibers, films, rods, tubes, molded objects, and the like. Another method for preparing the stabilized polymeric compositions of this invention comprises mixing the salt additive into the polymer on hot mill rolls or in an extruder. The melt polymeric composition and salt additive can then be extruded into a shaped object such as fibers or film, or other molded objects. Alternatively, the milled or extruded polymeric composition can be granulated and used for injection molding. Other methods for incorporating the salt additive into polymers are apparent to those skilled in the art.

The amount of the salt additive component which can be employed depends upon the degree of stability desired. For example, about 5% by weight of the salt additive, based on the weight of the polymer, would be the maximum required for preventing degradation of the polymers under the most severe conditions. In some instances as little as 0.1% of the zinc and manganese salt will be effective to prevent ultraviolet and visible light degradation where the finished article is not subjected to a great amount of ultraviolet light.

Examples of suitable zinc and manganese salts useful in the invention are the zinc or manganese salts of 3,5-dialkyl-4-hydroxybenzoic acid such as manganese bis(3,5-di-tert-butyl-4-hydroxybenzoate), zinc bis(3,5-di-tert-butyl-4-hydroxybenzoate), manganese bis(3,5-di-tert-amny-4-hydroxybenzoate), zinc bis(3,5-di-tert-amyl-4-hydroxybenzoate) and bis 3,5-bis(1-methylcyclohexyl)-4-hydroxybenzoate.

The ultraviolet stabilized organic compositions of the present invention may also contain other additives, pigments, colorants, stabilizers, nucleation agents, and the like. For example, titanium dioxide pigmented polymeric compositions, such as polyolefins, may also contain and generally do contain other additives such as antioxidants, plasticizers, flow aids, processing aids, polymeric modifiers and the like.

This invention will be further illustrated by the following examples, although it will be understood that these examples are included merely for purposes of illustration and are not intended to limit the scope of the invention.

EXAMPLES 1-5

The additives listed in the following Table I are incorporated into clear polypropylene by hot roll compounding. Films (5 mil nominal thickness) are pressed from these compositions, mounted in Pyrex test tubes, and irradiated until embrittlement in a Rayonet reactor equipped with 3000 A lamps. The temperature of the reactor was held between 65°–70°C.

The results of these tests are shown in Table 1.

Table 1

Photolytic Stability of Polypropylene Films Irradiated at 3000A and Containing the Zinc and Manganese Salts of (a) and 2,4-Di-tert-butyl-6-(5-Chloro-2H-benzotriazol-2-yl)phenol and 4-(Dodecyloxy)-2-hydroxybenzophenone

| Additive (1.0%) | Days to Embrittlement |
|---|---|
| None | 4 |
| Zinc salt[a] | 11 |
| Nickel salt[a,b] | 56 |
| 4-(Dodecyloxy)-2-hydroxybenzophenone | 56 |
| 2,4-di-tert-butyl-6-(5-chloro-2H-benzotriazol-2-yl)phenol | 38 |

[a]Salts of 3,5-di-tert-butyl-4-hydroxybenzoic acid.
[b]Polymer films are green.

EXAMPLE II

Polypropylene copolymer containing about 1% graft acrylic acid is formed into films containing 15% of titanium dioxide and 0.75 pph of Irganox 1010 (registered trademark of Ciba-Geigy Limited) were pressed onto aluminum plates and weathered in a Uvatest apparatus (GEOPAR Industries, Ludlow, Massachusetts). Air saturated with water at room temperature is passed over the samples, 60° gloss is used to monitor degradation, the results obtained are shown in the following table:

Table 2

Photolytic Stability of Polypropylene-g-acrylic Acid Pigmented With 15% Ti-Pure R-100 and Containing 0.75% Irganox 1010 in Combination With the Zinc and Manganese Salts of (a) and 2,4-Di- tert-butyl-6-(5-chloro-2H-benzotriazol-2-yl)phenol

| Additive (1.0%) | Hours to 25% Reduction in Gloss |
|---|---|
| None | 500 |
| 2,4-di-tert-butyl-6-(5-chloro-2H-benzotriazol-2-yl)phenol | 670 |
| Manganese salt[a] | 900 |
| Zinc salt[a] | 1500 |

[a]Salt of 3,5-di-tert-butyl-4-hydroxybenzoic acid.

EXAMPLE III

Polypropylene containing 0.1% of 2,6-di-tert-butyl-4-methylphenol, 0.3% of dilaurylthiodipropionate, 1.0% stabilizer and 5% by weight, titanium dioxide was pressed into films and weathered in a Rayonet reactor equipped with 3000A lamps. The temperature of the reactor held between 65°–70°C. The results obtained are shown in the following table:

Table 3

Photolytic Stability of Polypropylene Films Pigmented With 5% Ti-Pure R-100 and Containing the Zinc Salt of 2,4-Di-tert-butyl-6-(5-chloro-2H-benzotriazol-2-yl)phenol and 4-(Dodecyloxy)-2-hydroxybenzophenone

| Additive (1.0%) | Days to Embrittlement |
|---|---|
| None | 4 |
| 4-(Dodecyloxy)-2-hydroxy-phenone | 4 |
| 2,4-Di-tert-butyl-6-(5-chloro-2H-benzotriazol-2-yl)phenol | 4 |
| Zinc salt[a] | 21 |

[a]Salt of 3,5-di-tert-butyl-4-hydroxybenzoic acid.

EXAMPLE IV

Polypropylene containing 0.1% of 2,6-di-tert-butyl-4-methylphenol, 0.3% of dilaurylthiodipropionate, 1.0% additive and 5%, by weight, of titanium dioxide was pressed into 5-mil thick films and irradiated in a Rayonet reactor equipped with 3000A lamps. The temperature of the reactor was held between 65°–70°C. The results obtained are shown in the following Table 4:

Table 4

Photolytic Stability of Polypropylene Films Pigmented With 5% Ti-Pure R-100 and Selected Zinc Benzoates, 2,4-Di-tert-butyl-6-(5-chloro-2H-benzotriazol-2-yl)phenol and 4-(Dodecyloxy)-2-hydroxybenzophenone

| Additive (1.0%) | Days to Embrittlement |
|---|---|
| None | 4 |
| 4-(dodecyloxy)-2-hydroxybenzophenone | 4 |
| 2,4-di-tert-butyl-6-(5-chloro-2H-benzotriazol-2-yl)phenone | 4 |
| Zinc bis(3,5-dimethyl-4-hydroxybenzoate) | 6 |
| Zinc benzoate | 4 |
| Zinc bis(2-hydroxybenzoate) | 6 |
| Zinc bis(4-hydroxybenzoate) | 5 |
| Zinc bis(5-methyl-3-tert-butyl-4-hydroxybenzoate) | 10 |

EXAMPLE V

Cellulose acetate butyrate containing 0.2% p-tert-butylphenol, 8.5% dibutylazelate, 1.0% additive and 5% titanium dioxide was pressed into 5-mil thick films and irradiated in a Rayonet reactor equipped with 3000A lamps. The temperature of the reactor was held between 65°–70°C. The results obtained are shown in the following table:

Table 5

Effect of Selected Stabilizers on the Photostability of Titanium Dioxide Pigmented (5%) Cellulose Acetate Butyrate Films[1]

| Additive (1.0%) | Days to Embrittlement |
|---|---|
| None | 17 |
| Resorcinol monobenzoate | 35 |
| 2-Hydroxy-4-methoxybenzophenone | 25 |
| Zinc bis(3,5-di-tert-butyl-4-hydroxybenzoate) | 144 |
| Manganese bis(3,5-di-tert-butyl-4-hydroxybenzoate) | 60 |

[1]Films irradiated with 3000A lamps in a reactor with an air temperature of 65–70°C.

Although the invention has been described in considerable detail with particular reference to certain preferred embodiments thereof, variations and modifications can be effected within the spirit and scope of the invention.

We claim:

1. An ultraviolet light stabilized pigmented polymeric composition comprising (1) a polymeric composition normally susceptible to degradation due to visible or ultraviolet light selected from the group consisting of polypropylene and polypropylene containing graft reacted acrylic acid, (2) titanium dioxide and (3) as the ultraviolet stabilizer about 0.01 to 5 weight percent of a zinc salt of a compound having the formula

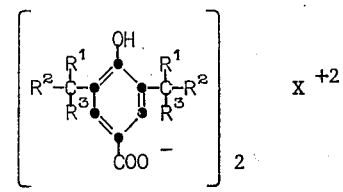

wherein $R^1$, $R^2$ and $R^3$ are the same or different and each represents an alkyl group having 1 to 8 carbon atoms; and $X^{+2}$ is $Zn^{+2}$.

2. An ultraviolet light stabilized pigmented composition of claim 1 wherein the polyolefin is polypropylene.

3. An ultraviolet light stabilized pigmented composition of claim 1 wherein the polyolefin is a polypropylene containing graft reacted acrylic acid.